June 10, 1930.  M. B. ROCK  1,763,444
MUSIC TEACHING DEVICE
Filed Nov. 16, 1928   4 Sheets-Sheet 1
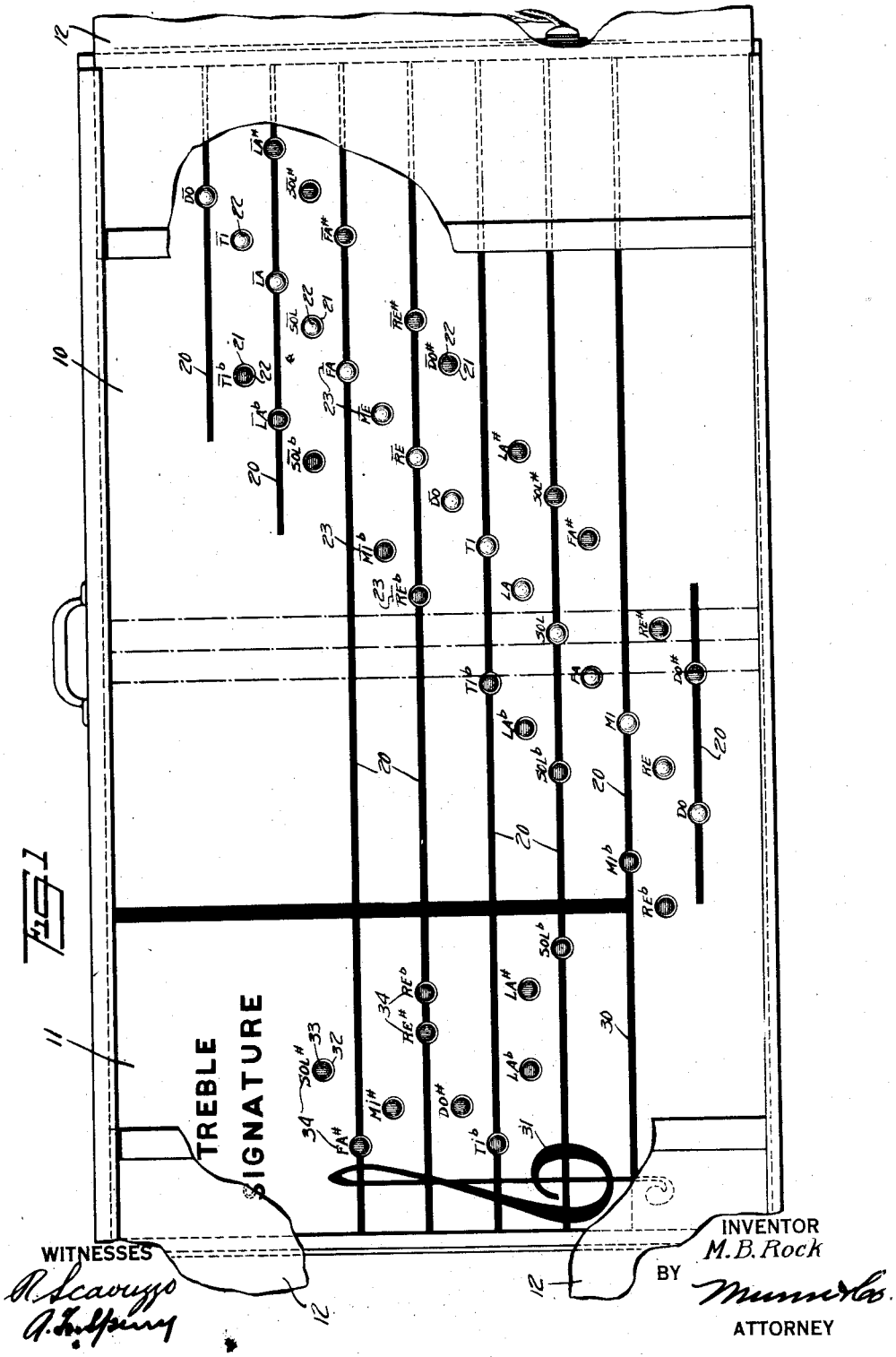
INVENTOR
M. B. Rock

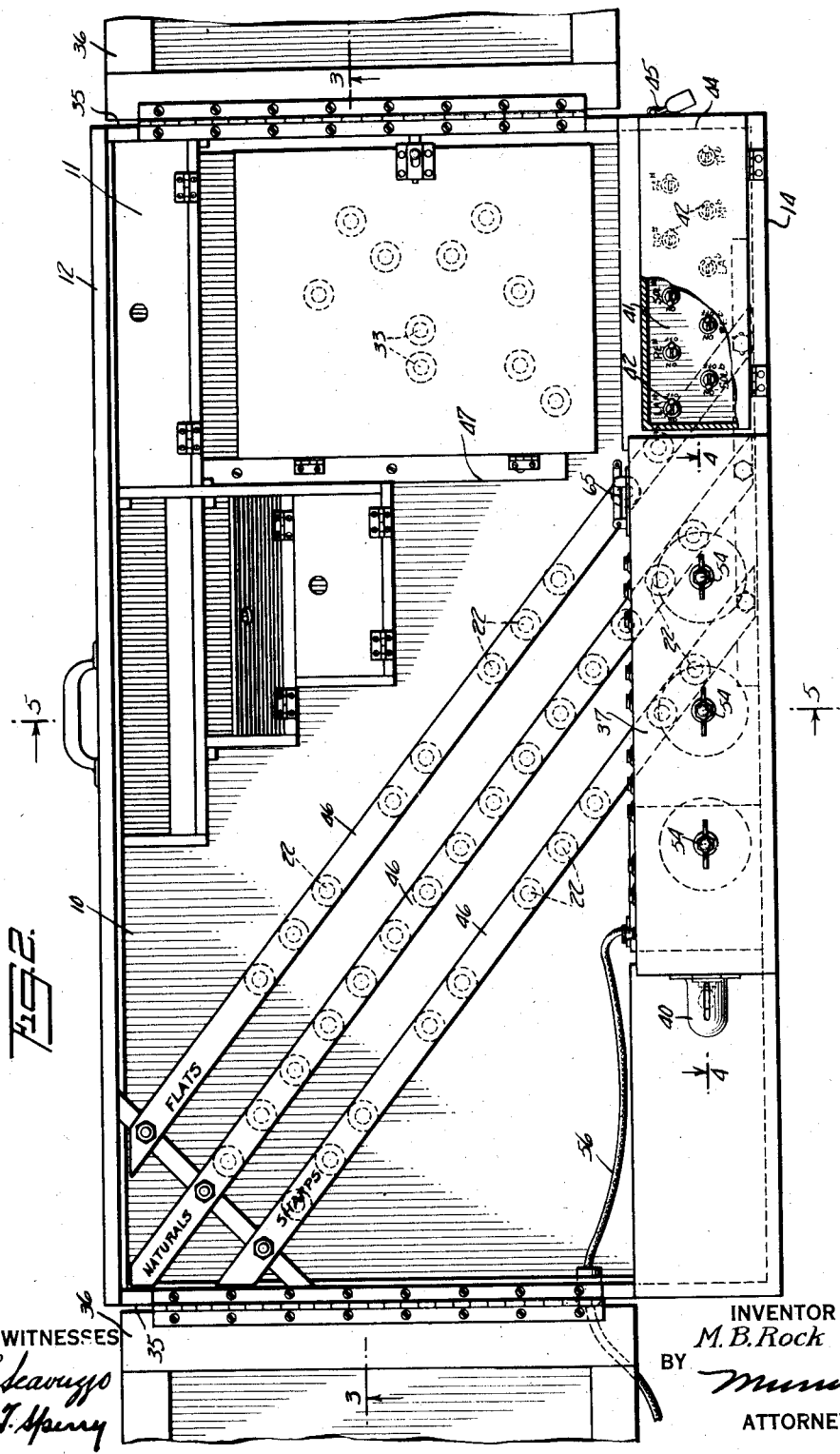

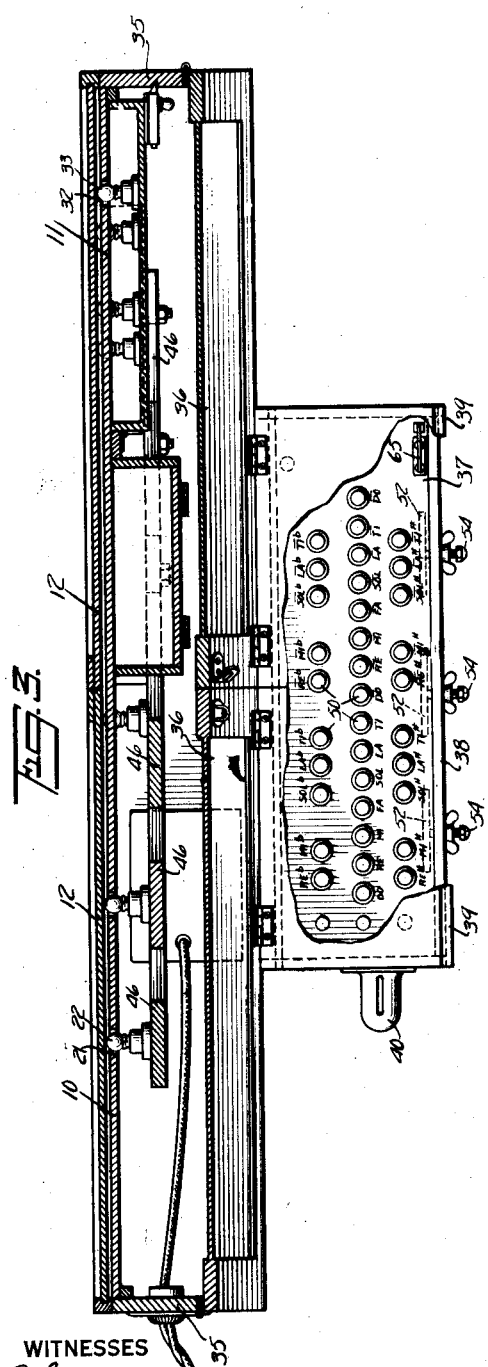

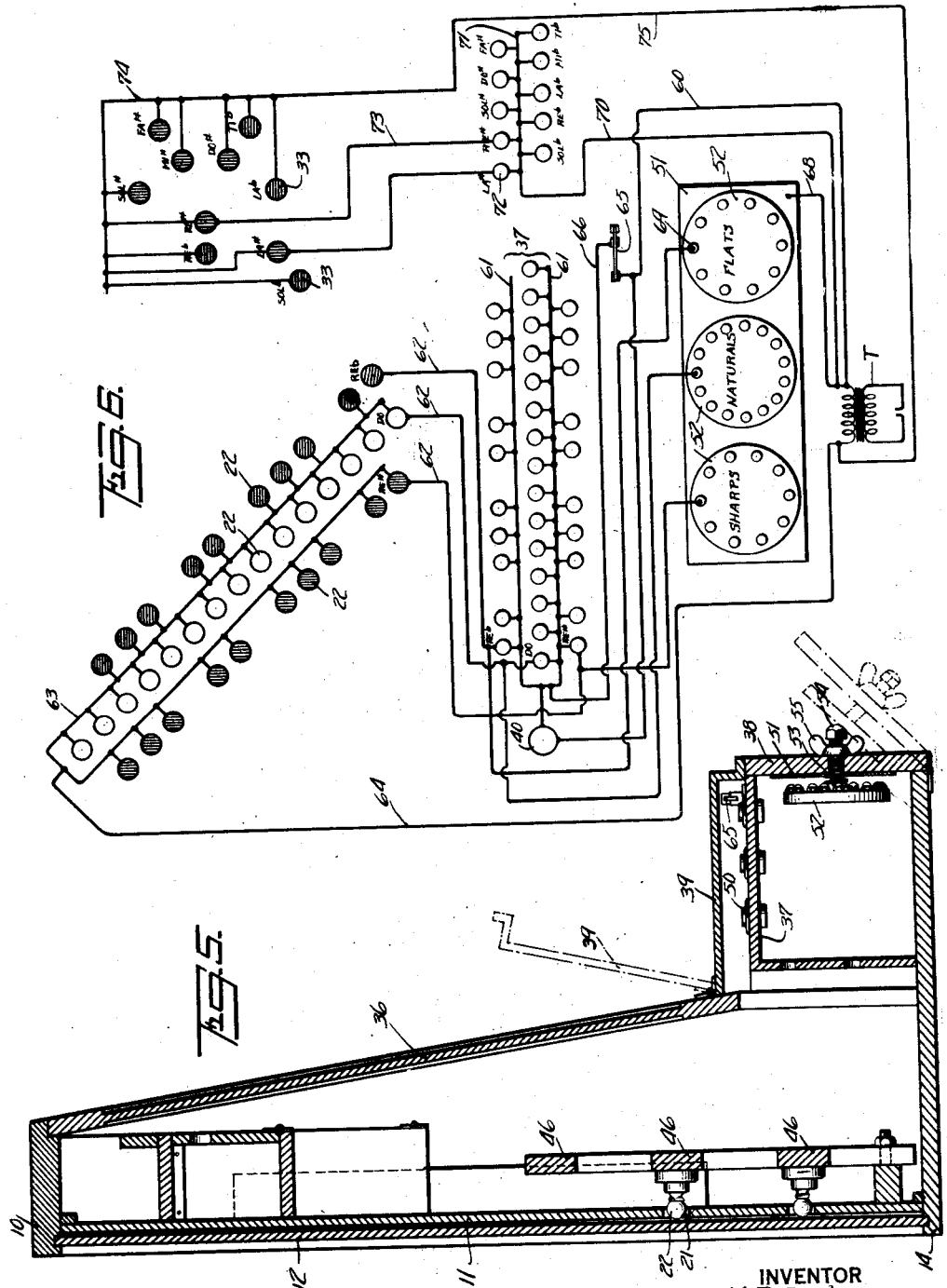

Patented June 10, 1930

1,763,444

UNITED STATES PATENT OFFICE

MICHAEL B. ROCK, OF STATEN ISLAND, NEW YORK

MUSIC-TEACHING DEVICE

Application filed November 16, 1928. Serial No. 319,912.

This invention relates to an apparatus for teaching music.

The invention relates particularly to an apparatus to assist in the teaching of music reading as necessary in sight singing or the like, and is an improvement on United States Letters Patent No. 1,685,682, granted to me September 25, 1928.

In accordance with my present invention, I provide a staff board member having a number of lights representing notes on the scale. These lights are controllable by a keyboard manipulated by the teacher, and having sounded a fundamental tone, the students will quickly learn to sing at sight the notes illuminated by the lights flashed on the staff board. In the present invention I incorporate with the staff board a signature staff provided with a plurality of lights denoting sharps and flats, which, in combination with the staff board indicating the notes will teach the pupil to associate with simple note reading the staff signature.

One advantage of the apparatus is that the keyboards for controlling the signature staff and the notes on the staff board may be conveniently manipulated by anyone having a superficial familiarity with music. The relation of the note location and the staff signature is so accentuated by the apparatus that the student will readily become familiar with the note location in relation to the staff signature, whereby he may sing readily a series of notes or a tune by following the flash of lights on a staff board in combination with the staff signature.

Other and more general objects of the invention are to provide an apparatus of this nature which is conveniently portable so that the teacher may carry it about from one class room to another, an apparatus of simple, practical construction which will be rugged and durable in use and well suited to the requirements of economic manufacture, and convenient manipulation.

Added novel features of the present device as compared with the apparatus disclosed in my copending application, include the signature staff and the keyboard control system therefor, together with a novel circuit and apparatus, whereby the colored lights of the staff board may be simultaneously flashed or all lights of a single color may be flashed together to provide a signalling system for the pupils.

Another improved feature of the present apparatus, is the provision of a circuit controlling switch, whereby a plurality of lights may be flashed at a single time and thus chords may be indicated upon the staff board.

Considering my present invention, it will be understood that it provides an improved apparatus especially designed for the instruction of adult pupils, preliminary instruction of which may be accomplished through the use of the apparatus disclosed in my copending application above referred to.

With the above noted and other objects in view, the invention consists in certain novel features of construction and combinations and arrangements of parts as will be more fully hereinafter described and pointed out in the claims.

The invention may be more fully understood from the following description in connection with the accompanying drawings, wherein—

Fig. 1 is a view in front elevation of the apparatus with the covers partially removed to disclose the staff board and the signature staff.

Fig. 2 is a rear elevation showing the apparatus with the doors open and the signature control cover broken away.

Fig. 3 is a sectional view taken on lines 3—3 of Fig. 2.

Fig. 4 is a sectional view taken on lines 4—4 of Fig. 2.

Fig. 5 is a vertical section taken on lines 5—5 of Fig. 2.

Fig. 6 is a wiring diagram.

Referring more particularly to the drawings, the front of the apparatus includes a staff board indicated as at 10 in combination with a signature board indicated at 11. In transportation the sliding covers 12 are provided, adapted to enclose the staffs 10 and 11. These covers 12 are adapted to be received within suitable guide portions provided in the base 14 and top 15 of the apparatus as shown in Fig. 5.

The staff board 10 is provided with a plurality of lines 20 adapted to simulate the usual musical scale. On or between the lines 20, there is provided a plurality of apertures 21 through which electric light bulbs or other controllable illuminated bodies 22 are provided. The bulbs 22 together with the apertures 21 are provided in the form of three parallel rows positioned with respect to the lines 20 and spaces therebetween as they would appear upon a printed music staff, each note having adjacent thereto suitable indicia as at 23. The first row of bulbs 22 is preferably red, and indicates the sharps of the scale. The intermediate row is preferably formed of clear or white bulbs which indicate the fundamental notes. The third row is formed of blue bulbs and indicates the flat notes of the staff.

It may thus readily be seen that the staff is designed to represent any given note of the octave indicated upon the signature staff, and by the proper manipulation of the staff board and control panel, as will be hereinafter described, any desired note may be indicated upon the staff board.

At the extreme right of the staff board, the signature board is provided, which includes the five staff lines 30 and the desired clef 31, and which is provided with apertures 32 through which bulbs 33 are provided for indicating the desired sharps or flats to be read in conjunction with the notes upon the staff board 10. Adjacent the apertures 32 and bulbs 33, suitable indicia 34 is provided to assist in reminding the student of the note referred to by the flash of the bulbs 33. The bulbs 33 representing the flats may be blue to conform with blue flat notes of the staff 10, while the sharps are represented by red bulbs in conformity with the red sharp notes of the staff board 10.

Referring to Fig. 2 of the drawings it will be noted that the cabinet includes side members 35 cooperating with the top and bottom 12 and 14 respectively. The rear edges of the sides 35 are provided with hinged cover members 36 which may be suitably locked in closed position as indicated in Fig. 3. The bottom of the cabinet 14 extends beyond the top 12 to provide for a note-controlling keyboard 37, together with the multiple light switch panel 38 over which a hinged cover 39 associated with the covers 36 is provided.

Mounted upon the end of the note controlling keyboard and in combination with the electrical circuit of the device, as will be hereinafter described, a pilot light 40 is provided adapted to flash with the flashing of the notes, whereby the proper functioning of the device will be apparent to an operator standing in the rear thereof.

Upon the right of the note-controlling keyboard compartment, a signature controlling keyboard 41 is provided including the switches 42 associated with the bulbs 33 of the signature staff. A hinged cover 43 is provided adapted to be locked as at 45 in a position to enclose the board 41. The bulbs 22 associated with the note staff 10 are mounted upon suitable angularly disposed supporting members 46 and secured within the cabinet in spaced relation to the board 10, as indicated in Fig. 3. The signature bulbs 33 are preferably mounted by hinged panel 47 and thus are retained adjacent the apertures 32 in a signature staff, but in spaced relation thereto. It will be apparent that upon hinged movement of the panel 47, the bulbs 33 are readily accessible for changes and repairs. Within the cabinet, suitable accessory compartments 48 may be provided within which spare bulbs, tools, or other matter may be placed.

The note-controlling keyboard 37 is provided with a plurality of switches 50, and if desired the keyboard assembly may be slidably positioned within the housing, whereby it may be readily removed for repairs to the switches or the associated electrical conductors. The multiple switch panel 38 is provided on its rear face with a conducting plate 51 with which are associated three conductor discs 52, all the lights of one color being controllable through the disc 52, which, upon movement to contact with the conductor 51 against the tension of its spring 53 will cause all of the lights of its associated color to flash upon the note staff. Movement of the discs 52 is preferably controlled by the provision of the externally threaded spindle 54 in combination with a wing nut 55. It will be readily seen that upon rotation of the wing nut, the disc 52 will be forced against the tension of the spring 53 into contact with the conductor plate 51.

Referring more particularly to Fig. 6, the electrical circuit has been illustrated. It will be readily understood that the illustration is entirely diagrammatic, and to simplify the illustration, it has not been deemed necessary to disclose all of the control wires leading from the switches to the bulbs. The circuit includes a transformer T which may be supplied with energy from any suitable source such as the electric light circuit; the energy being supplied through a conductor 56 as indicated in Fig. 2. Leading from the transformer T there is provided a conductor 60 leading through the pilot lamp 40 and to bus bars 61 in association with which the switch buttons of the note staff are provided; a conductor as indicated at 62 being provided from each switch button to each lamp 22. The lamps are also in association with return buses 63 which are in circuit through a conductor 64 with the opposite side of the transformer T.

When it is desired to illuminate more than one of the bulbs 22 there is provided a shunt circuit including a shunting switch 65 and conductor 66, which shunts the electrical energy from the transformer T between the conductor 60 and the buses 61 without delivering the energy through the pilot light 40, and thus permitting greater energy to be delivered to the bulbs 22, whereby a plurality may be lighted at one time. For illuminating all of the bulbs 22 of a single color, there is provided from the transformer T a conductor 68 associated with the conducting plate 51, adjacent which the discs 52 are mounted. Each of the discs 52 is provided with a plurality of connecting points 69, one associated with each of the conductors 62 for controlling the bulbs 22. Thus, when the discs 52 are moved to contact with the conducting plate 51, each of the contact points 69 delivers energy from the transformer through the conductors 62 to each of the bulbs of the color controlled by the disc thus caused to contact. It will be noted that the conductors leading from the discs 52 to the bulbs 22 do not pass through the pilot light 40, and thus the energy delivered from the transformer T is not reduced by energization of the pilot lamp 40.

The control of the bulbs 33 of the signature staff is similar to the control of the bulbs 22 of the note staff. In this case, a conductor 70 from the transformer is associated with a bus 71 in combination with which control buttons 72 are provided adapted to control passage of electrical energy from the bus 71 to conductors 73 associated with the bulbs 33. The return circuit from the bulbs includes a bus 74 associated with each bulb and with a conductor 75 leading to the opposite side of the transformer T.

Various changes and alterations may be made in the general form and arrangement of the parts described without departing from the spirit of the invention, and hence I do not wish to limit myself to the precise details set forth, but shall consider myself at liberty to make such changes and alterations as fairly fall within the spirit and scope of the appended claims.

I claim:

1. In a device of the character described, a staff board, a clef signature board, and controllable indicia for separately indicating musical symbols on each of said boards.

2. In a device of the character described, a staff board, a clef signature board and electrically controllable indicia for separately indicating musical symbols on each of said boards.

3. In a device of the character described, a staff board, a clef signature board and electrically controllable indicia for indicating musical symbols on each of said boards, said indicia being controllable by separate electrical switches in the rear of said boards.

4. In a device of the character described, a staff board, a clef signature board, and controlled indicia for indicating musical symbols on said boards, the indicia of said staff board and said clef signature board being separately controllable.

5. An apparatus for teaching sight singing including a casing, a staff board and a clef board displayed on the front of said casing, controllable indicia on each of said boards and a separate keyboard for each of said boards attached to the rear of said casing for controlling said indicia.

6. An apparatus for teaching sight singing including a casing. a staff board and clef board displayed on the front of said casing, light bulbs associated with said boards, and keyboards in the rear of said casing for controlling said bulbs.

7. An apparatus for teaching sight singing including a casing, a staff board and clef board displayed on the front of said casing, light bulbs associated with said boards, a keyboard in the rear of said casing for controlling said bulbs, and a pilot light in circuit with said bulbs adapted to flash when any of the bulbs of said staff board are illuminated.

8. An apparatus for teaching sight singing including a casing, a staff board and clef board displayed on the front of said casing, light bulbs associated with said boards, a keyboard in the rear of said casing for controlling said bulbs, a pilot light in circuit with said bulbs adapted to flash when any of the bulbs of said staff board are illuminated, and means for cutting the pilot light from the bulb circuits, whereby energy may be delivered to said bulbs for illuminating a plurality thereof at one time.

9. An apparatus for teaching sight singing including a casing, a staff board and a clef board displayed on the front of said casing, separately controllable indicia on each of said boards, and separate means for separately controlling the indicia of each board.

10. An apparatus for teaching sight singing including a casing, a staff board and a clef board displayed on the front of said casing, separately controllable indicia on each of said boards, separate means for separately controlling the indicia of each board, and means for controlling a plurality of indicia of the staff board simultaneously.

11. An apparatus for teaching sight singing including a casing, a staff board and a clef board displayed on the front of said casing, controllable indicia associated with each of said boards, means in the rear of said casing for separately controlling said indicia, and means associated therewith for simultaneously controlling a plurality of the staff board, said means being operable to control simultaneously all of said indicia.

Signed at New York in the county of New York and State of New York, this 15th day of November, A. D. 1928.

MICHAEL B. ROCK.